US011859030B2

(12) United States Patent
Leskinen et al.

(10) Patent No.: US 11,859,030 B2
(45) Date of Patent: Jan. 2, 2024

(54) PROCESS FOR PRODUCING A HETEROPHASIC PROPYLENE COPOLYMER HAVING A HIGH XYLENE COLD SOLUBLE FRACTION (XCS)

(71) Applicant: BOREALIS AG, Vienna (AT)

(72) Inventors: Pauli Leskinen, Porvoo (FI); Jingbo Wang, Linz (AT); Markus Gahleitner, Linz (AT)

(73) Assignee: BOREALIS AG, Vienna (AT)

( * ) Notice: Subject to any disclaimer, the term of this patent is extended or adjusted under 35 U.S.C. 154(b) by 327 days.

(21) Appl. No.: 17/273,246

(22) PCT Filed: Sep. 24, 2019

(86) PCT No.: PCT/EP2019/075609
§ 371 (c)(1),
(2) Date: Mar. 3, 2021

(87) PCT Pub. No.: WO2020/064673
PCT Pub. Date: Apr. 2, 2020

(65) Prior Publication Data
US 2021/0206895 A1    Jul. 8, 2021

(30) Foreign Application Priority Data
Sep. 28, 2018   (EP) .................................. 18197555

(51) Int. Cl.
| | |
|---|---|
| *C08F 210/16* | (2006.01) |
| *C08F 210/06* | (2006.01) |
| *C08F 4/64* | (2006.01) |
| *C08L 23/12* | (2006.01) |
| *C08L 23/16* | (2006.01) |
| *C08F 4/659* | (2006.01) |

(52) U.S. Cl.
CPC .......... *C08F 210/06* (2013.01); *C08F 210/16* (2013.01); *C08F 4/64* (2013.01); *C08F 4/659* (2013.01); *C08L 23/12* (2013.01); *C08L 23/16* (2013.01); *C08L 2207/02* (2013.01)

(58) Field of Classification Search
CPC ...... C08F 210/16; C08F 210/06; C08L 23/16; C08L 23/12; C08L 2207/02
See application file for complete search history.

(56) References Cited

U.S. PATENT DOCUMENTS

| | | | | |
|---|---|---|---|---|
| 6,487,606 B1 * | 11/2002 | Minyard | ............. | H04L 49/9057 370/452 |
| 6,841,634 B1 * | 1/2005 | Ernst | ........................ | C08F 10/00 526/201 |
| 9,273,167 B2 * | 3/2016 | Sandholzer | ............ | C08F 210/06 |
| 9,290,649 B2 * | 3/2016 | Tranninger | ............. | C08F 2/001 |
| 9,353,252 B2 * | 5/2016 | Gahleitner | ................. | C08J 5/18 |
| 9,394,073 B2 * | 7/2016 | Bernreitner | ............. | C08L 23/14 |
| 9,487,606 B2 * | 11/2016 | Gahleitner | ............ | C08F 210/06 |
| 9,540,506 B2 * | 1/2017 | Gahleitner | ............ | C08L 23/142 |
| 9,695,308 B2 * | 7/2017 | Gahleitner | ............ | C08L 23/142 |
| 9,777,142 B2 * | 10/2017 | Sandholzer | ............. | C08L 23/14 |
| 9,840,616 B2 * | 12/2017 | Gahleitner | ............... | C08K 5/14 |
| 9,890,274 B2 * | 2/2018 | Wang | ....................... | C08L 23/12 |
| 9,890,275 B2 * | 2/2018 | Sandholzer | ............. | C08L 23/16 |
| 10,442,883 B2 * | 10/2019 | Wang | ..................... | C08L 23/142 |
| 10,519,306 B2 * | 12/2019 | Wang | ......................... | C08J 5/18 |
| 11,084,919 B2 * | 8/2021 | Wang | ....................... | C08L 23/16 |
| 2021/0317242 A1 * | 10/2021 | Vestberg | ................. | C08L 23/12 |

FOREIGN PATENT DOCUMENTS

| | | | |
|---|---|---|---|
| CN | 103201338 A | 7/2013 | |
| CN | 106795346 A | 5/2017 | |
| EP | 2415790 A1 | 2/2012 | |
| EP | 02610270 A1 | 7/2013 | |
| EP | 02610271 A1 | 7/2013 | |
| EP | 02610272 A1 | 7/2013 | |
| EP | 3 495 420 A1 * | 6/2019 | ............. C08L 23/10 |
| EP | 3495420 A1 | 6/2019 | |
| JP | 2011/195661 A | 10/2011 | |
| WO | 1994/0026794 A1 | 11/1994 | |
| WO | 2012/007430 A1 | 1/2012 | |
| WO | 2016066453 A2 | 5/2016 | |
| WO | 2017/0148969 A1 | 9/2017 | |
| WO | 2018/025863 A1 | 2/2018 | |

OTHER PUBLICATIONS

Applicant: Borealis AG; European Patent Application No. 18197555. 8; "Process for Producing a Heterophasic Propylene Copolymer Having a High Xylene Cold Soluble Fraction (XCS)"; Extended European Search Report; dated Mar. 12, 2019; 5 pgs.
Zhou, Zhe, et al., "A New Decoupling Method for Accurate Quantification of Polyethylene Copolymer Composition and Triad Sequence Distribution With 13C NMR", Journal of Magnetic Resonance 187 (2007) 225-233.
Busico, Vincenzo, et al., "ALK-1-ENE Polymerization in the Presence of a Monocyclopentadienyl Zirconium(IV) Acetamidinate Catalyst: Microstructural and Mechanistic Insights", Macromol. Rapid Commun. 2007, 28,1128-1137.
Cheng, H. N., Macromolecules 17 (1984), 1950.
Resconi, Luigi, et al., "Selectivity in Propane Polymerization With Metallocene Catalysts", Chem. Rev. 2000, 100, 1253-1345.
Wang, Wen-Jun, et al., "Structural Analysis of Ethylene/Propylene Copolymers Synthesized With a Constrained Geometry Catalyst", Macromolecules 2000, 33, 1157-1162.

(Continued)

*Primary Examiner* — Rip A Lee
(74) *Attorney, Agent, or Firm* — TAROLLI, SUNDHEIM, COVELL & TUMMINO L.L.P.

(57) ABSTRACT

The present invention relates to a process for producing a heterophasic propylene copolymer (RAHECO) having a xylene cold soluble fraction (XCS) determined according to ISO 16152 (25° C.) of more than 30 wt.-%, a heterophasic propylene copolymer (RAHECO) produced by the process as well as an article, preferably a film, a flexible tube or cable insulation, comprising the heterophasic propylene copolymer (RAHECO).

17 Claims, No Drawings

(56) References Cited

OTHER PUBLICATIONS

Kakugo, Masahiro, et al., "13C NMR Determination of Monomer Sequence Distribution in Ethylene-Propylene Copolymers Prepared with d-TiC13-Al(C2H5)2 Cl" Macromolecules 1982, 15, 1150-1152.
Singh, Gurmeet, et al., "Triad Sequence Determination of Ethylene-Propylene Copolymers—Application of Quantitative 13C NMR", Polymer Testing 28 (2009) 475-479.
Applicant: Borealis AG; European Patent Application No. 18197555.8; Office Action; dated Feb. 21, 2021; 4 pgs.
Applicant: Borealis AG; "Process for Producing a Heterophasic Propylene Copolymer Having a High Xylene Cold Soluble Fraction"; Chinese Application No. 201980058759.6; Chinese Office Action dated Sep. 1, 2022; 20 pgs.

\* cited by examiner

PROCESS FOR PRODUCING A HETEROPHASIC PROPYLENE COPOLYMER HAVING A HIGH XYLENE COLD SOLUBLE FRACTION (XCS)

The present invention relates to a process for producing a heterophasic propylene copolymer having a xylene cold soluble fraction (XCS) determined according to ISO 16152 (25° C.) of more than 30 wt.-%, a heterophasic propylene copolymer produced by the process as well as an article, preferably a film, a flexible tube or cable insulation, comprising the heterophasic propylene copolymer.

Heterophasic propylene copolymers are well known in the art. Such heterophasic propylene copolymers comprise a matrix being either a propylene homopolymer or a random propylene copolymer in which an elastomeric phase is dispersed. Thus the polypropylene matrix contains (finely) dispersed inclusions being not part of the matrix and said inclusions contain the elastomer. The term inclusion indicates that the matrix and the inclusion form different phases within the heterophasic propylene copolymer, said inclusions are for instance visible by high resolution microscopy, like electron microscopy or scanning force microscopy.

Soft heterophasic propylene copolymer compositions require rather high amounts of elastomeric phase, i.e. the xylene cold soluble (XCS) content will be high. However, the catalyst's capability to handle high amounts of elastomer phase is typically a key factor in the production of such heterophasic propylene copolymer compositions. Furthermore, the high amounts of elastomeric phase often adversely affects the flowability of the final material. In addition thereto, the production of the heterophasic propylene copolymer compositions is typically carried out in the presence of a Ziegler-Natta catalyst comprising phthalic compounds. However, such phthalic compounds are not desired in many final applications.

Therefore, it is an object of the present invention to produce a heterophasic propylene copolymer having a high xylene cold soluble fraction (XCS), which is free of phthalic compounds and shows high flowability. The heterophasic propylene copolymer free of phthalic compounds means that any compounds or components used in the process for producing said polymer and catalyst do not contain any phthalic compounds.

The finding of the present invention is that a solid Ziegler-Natta catalyst component being free of phthalic compounds is to be provided and subjected into a batch mode catalyst prepolymerization step in order to produce a heterophasic propylene copolymer having a xylene cold soluble fraction (XCS) determined according ISO 16152 (25° C.) of more than 30 wt.-%, preferably more than 35 wt.-%.

Accordingly, the present invention is directed to a process for producing a heterophasic propylene copolymer having a xylene cold soluble fraction (XCS) determined according to ISO 16152 (25° C.) of more than 30 wt.-%, the process comprising the steps of:

a) providing a solid Ziegler-Natta catalyst component being free of phthalic compounds,
b) subjecting the solid Ziegler-Natta catalyst component of step a) into a batch mode catalyst prepolymerization step, wherein the solid Ziegler-Natta catalyst component is prepolymerized in the presence of one or more olefin monomer(s) selected from olefin monomers of 2 to 4 carbon atoms in the presence of an external electron donor (ED) to obtain a prepolymerized solid Ziegler-Natta catalyst,
c) polymerizing in one or more polymerization reactor(s) propylene and optionally ethylene and/or a $C_4$ to $C_8$ α-olefin in the presence of the prepolymerized solid Ziegler-Natta catalyst of step b), forming the first propylene homo- or copolymer,
d) polymerizing in one or more further polymerization reactor(s) in the presence of the first propylene homo- or copolymer propylene and ethylene and optionally a $C_4$ to $C_8$ α-olefin, to obtain the heterophasic propylene copolymer.

It has surprisingly been found out that such a process results in a soft heterophasic propylene copolymer being free of phthalic compounds and having high flowability.

The "batch mode catalyst prepolymerization step" may also be called as "off-line prepolymerization step". This batch mode catalyst prepolymerization step is thus to be distinguished from an optional prepolymerization step being part of the polymerization process setup called as process prepolymerization step, or on-line prepolymerization step. Such a process prepolymerization precedes the first actual polymerisation step, i.e. step c) in the present invention, and is typically carried out in continuous mode in commercial scale polymerization processes.

In one embodiment, the solid Ziegler-Natta catalyst component of step a) comprises (a1) a compound of a transition metal (TM), which transition metal is selected from one of the groups 4 to 6 of the periodic table (IUPAC), preferably a titanium compound, (a2) a compound of a metal (M) which metal is selected from one of the groups 1 to 3 of the periodic table (IUPAC), preferably a metal of group 2 of the periodic table (IUPAC), more preferably a magnesium compound, and (a3) an internal donor (ID) being a non-phthalic compound, preferably a non-phthalic acid ester.

In another embodiment, the internal donor (ID) of the solid Ziegler-Natta catalyst component is selected from optionally substituted malonates, maleates, succinates, glutarates, cyclohexene-1,2-dicarboxylates, citraconates, benzoates and derivatives and/or mixtures thereof, preferably the internal donor (ID) is a citraconate.

In yet another embodiment, the solid Ziegler-Natta catalyst component is free of an external support material.

In one embodiment, the batch mode catalyst prepolymerization step b) is carried out in the presence of a co-catalyst (Co) being a compound of Group 13 metal, preferably an Al compound.

In another embodiment, the mol ratio of the co-catalyst (Co) to the external electron donor (ED) [Co/ED] is in the range of 0.30 to 1.5, preferably in the range of 0.5 to 1.2, and/or the mol ratio of the co-catalyst (Co) to the compound of a transition metal (TM) [Co/TM] is in the range of 0.5 to 10.0, preferably in the range of 0.5 to 5.0, more preferably 0.7 to 3.0 in the batch-mode prepolymerization step.

In yet another embodiment, the weight ratio of the one or more olefin monomer(s) selected from olefin monomers of 2 to 4 carbon atoms to the solid Ziegler-Natta catalyst component (olefin monomer/solid Ziegler-Natta catalyst component) from step b) is in the range of 0.5 to 50, preferably in the range of 1 to 20, more preferably in the range of 1.5 to 10.

In one embodiment, step b) is conducted off-line in batch-mode in an inert medium, preferably the medium is an oil or a hydrocarbon solvent.

In another embodiment, the external donor (ED) used in the batch mode catalyst prepolymerization step b) is selected from silanes, ethers, esters, amines, ketones, heterocyclic compounds and blends thereof. It is especially preferred to use a silane. It is most preferred to use silanes of the general formula

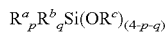
$R^a_p R^b_q Si(OR^c)_{(4-p-q)}$ wherein $R^a$, $R^b$ and $R^c$ denote a hydrocarbon radical, in particular an alkyl or cycloalkyl group, and wherein p and q are numbers ranging from 0 to 3 with their sum p+q being equal to or less than 3. $R^a$, $R^b$ and $R^c$ can be chosen independently from one another and can be the same or different. Specific examples of such silanes are (tert-butyl)$_2$Si(OCH$_3$)$_2$, (cyclohexyl)(methyl)Si(OCH$_3$)$^2$, (phenyl)$_2$Si(OCH$_3$)$_2$ and (cyclopentyl)$_2$Si(OCH$_3$)$_2$, or silanes of general formula

$Si(OCH_2CH_3)_3(NR^1R^4)$ wherein $R^1$ and $R^2$ can be the same or different a represent a hydrocarbon group having 1 to 12 carbon atoms.

$R^1$ and $R^2$ are independently selected from the group consisting of linear aliphatic hydrocarbon group having 1 to 12 carbon atoms, branched aliphatic hydrocarbon group having 1 to 12 carbon atoms and cyclic aliphatic hydrocarbon group having 1 to 12 carbon atoms. It is in particular preferred that $R^1$ and $R^2$ are independently selected from the group consisting of methyl, ethyl, n-propyl, n-butyl, octyl, decanyl, iso-propyl, iso-butyl, iso-pentyl, tert.-butyl, tert.-amyl, neopentyl, cyclopentyl, cyclohexyl, methylcyclopentyl and cycloheptyl.

More preferably both $R^1$ and $R^2$ are the same, yet more preferably both $R^3$ and $R^4$ are an ethyl group.

Especially preferred external donors (ED) are the pentyl dimethoxy silane donor (D-donor) or the cyclohexylmethyl dimethoxy silane donor (C-Donor).

In yet another embodiment, the polymerization process comprises a process prepolymerization step c0, preceding the actual polymerization steps c) and d), into which step the prepolymerized solid Ziegler-Natta catalyst obtained in step b) is fed.

In one embodiment, no additional external electron donor (ED) is added into the on-line prepolymerization step or polymerization steps c) and d).

In commercial scale production the on-line prepolymerization step is conducted in continuous mode.

In another embodiment, the polymerization step c) is conducted in at least one polymerization reactor, preferably in at least one slurry-loop reactor, more preferably in at least two polymerization reactors selected from slurry-loop and gas phase reactors, more preferably a combination of one slurry-loop reactor and one gas-phase reactor.

In yet another embodiment, the amount of polymer produced in step c) is in the range of 20 to 80 wt.-%, preferably 30 to 70 wt.-% based on the total amount of the heterophasic propylene copolymer produced in the process; and the amount of polymer produced in step d) is in the range of 20 to 80 wt.-%, preferably 30 to 70 wt.-%, based on the total amount of the heterophasic propylene copolymer produced in the process.

In one embodiment, the polymer produced in step c) is a propylene homopolymer or a propylene ethylene random copolymer; and the polymer produced in step d) forms an elastomeric part of the heterophasic propylene copolymer. More preferably, the polymer produced in step c) is a propylene ethylene random copolymer allowing the production of very soft propylene polymers.

The polymerization step d) is conducted in at least one reactor, preferably a gas phase reactor. In another embodiment the polymerization is conducted in step d) in two reactors, preferably gas phase reactors.

In another embodiment, the heterophasic propylene copolymer produced has i) a xylene cold soluble fraction (XCS) determined according to ISO 16152 (25° C.) of >35 wt.-%. In some embodiments, the xylene cold soluble fraction (XCS) determined according to ISO 16152 (25° C.) is >40 wt.-%. Additionally or alternatively, the heterophasic propylene copolymer produced has ii) a comonomer content of >10 wt.-%, preferably >14 wt.-%.

According to another aspect of the present invention, a heterophasic propylene copolymer produced by the process, as defined herein, is provided.

According to a still further aspect of the present invention, an article, preferably a film, a flexible tube or cable insulation, comprising the heterophasic propylene copolymer, as defined herein, is provided.

In the following, the present invention is described in more detail.

The heterophasic propylene copolymer produced by the present process is especially featured by a high xylene cold soluble fraction (XCS). It is thus appreciated that the heterophasic propylene copolymer produced by the present process has a xylene cold soluble fraction (XCS) determined according to ISO 16152 (25° C.) of more than 30 wt.-%.

In one embodiment, the heterophasic propylene copolymer produced by the present process has a xylene cold soluble fraction (XCS) determined according to ISO 16152 (25° C.) of >35 wt.-% or >40 wt.-%. For example, the heterophasic propylene copolymer produced by the present process has a xylene cold soluble fraction (XCS) determined according to ISO 16152 (25° C.) in the range from >30 wt.-% to 65 wt.-%, preferably from >35 wt.-% to 60 wt.-%, or in some embodiments >40 wt.-% to 60 wt.-%, or even >45 wt.-%.

Additionally or alternatively, the heterophasic propylene copolymer produced by the present process has a comonomer content of >10 wt.-%, preferably of >14 wt.-%. For example, the heterophasic propylene copolymer produced by the present process has a comonomer content in the range of >10 wt.-% to 25 wt.-%, preferably from >14 wt.-% to 22 wt.-%.

Thus, the heterophasic propylene copolymer produced by the present process has
i) a xylene cold soluble fraction (XCS) determined according to ISO 16152 (25° C.) of more than 35 wt.-%, preferably from >40 wt.-% to 60 wt.-%, and
ii) a comonomer content of >10 wt.-%, preferably of >14 wt.-%, more preferably from >14 wt.-% to 22 wt.-%.

In one embodiment, the heterophasic propylene copolymer produced by the present process has a melt flow rate MFR$_2$ (230° C./2.16 kg) measured according to ISO 1133 in the range of 0.3 to 30.0 g/10 min, preferably of 0.5 to 20.0 g/10 min.

As already mentioned above, the heterophasic propylene copolymer produced by the present process has a high xylene cold soluble fraction (XCS). In this regard, it is preferred that the xylene cold soluble fraction (XCS) has an intrinsic viscosity (IV) determined according to DIN ISO 162/1 (in decalin at 135° C.) in the range of 1.0 to 3.5 dl/g, preferably in the range of 1.4 to 3.0 dl/g, more preferably in the range of 1.4 to 2.5 dl/g.

It is appreciated that the heterophasic propylene copolymer produced by the present process is a random heterophasic propylene copolymer. That is to say, the heterophasic propylene copolymer comprises a matrix (M) (produced in step b)) being a propylene random copolymer (R-PP) and an elastomeric propylene copolymer (E) dispersed in said matrix (M). It is a finding of the present invention that the heterophasic propylene copolymer having a xylene cold soluble fraction (XCS) determined according ISO 16152 (25° C.) of more than 35 wt.-% must be produced in the presence of a Ziegler-Natta catalyst being free of phthalic compounds.

Thus, the heterophasic propylene copolymer produced by the present process is also free of phthalic compounds.

Preferably, the heterophasic propylene copolymer produced by the present process comprises as polymer components only the propylene homopolymer (H-PP) or random propylene copolymer and the elastomeric propylene copolymer (E). In other words, the heterophasic propylene copolymer may contain further additives but no other polymer in an amount exceeding 5.0 wt.-%, more preferably exceeding 3.0 wt.-%, like exceeding 1.0 wt.-%, based on the total heterophasic propylene copolymer. One additional polymer which may be present in such low amounts is a polyethylene which is a by-reaction product obtained by the preparation of the heterophasic propylene copolymer. Accordingly, it is in particular appreciated that the instant heterophasic propylene copolymer contains only the propylene homopolymer (H-PP) or random propylene copolymer (R-PP), the elastomeric propylene copolymer (E) and optionally polyethylene in amounts as mentioned in this paragraph.

Preferably, the heterophasic propylene copolymer produced by the present process comprises, especially consists of, monomers copolymerizable with propylene from the group consisting of comonomers selected from ethylene, 1-butene and 1-hexene, more specifically the comonomers are selected from ethylene and/or 1-butene. In a more preferred embodiment, the heterophasic propylene copolymer produced by the present process comprises units derivable from ethylene and propylene only.

In one embodiment, the elastomeric propylene copolymer (E) is preferably a propylene-ethylene rubber (EPR), whereas the random propylene copolymer (R-PP) is a random propylene ethylene copolymer (R-PP).

As mentioned above the matrix (M) of the heterophasic propylene copolymer produced by the present process can be a propylene homopolymer (H-PP).

The expression propylene homopolymer (H-PP) as used throughout the instant invention relates to a polypropylene that consists substantially, i.e. of equal or below than 99.5 wt.-%, of propylene units. In a preferred embodiment only propylene units in the propylene homopolymer (H-PP) are detectable.

In case the matrix (M) is a random propylene copolymer (R-PP), it is appreciated that the random propylene copolymer (R-PP) comprises monomers copolymerizable with propylene, for example comonomers such as ethylene and/or $C_4$ to $C_8$ α-olefins, e.g. 1-butene and/or 1-hexene. Preferably the random propylene copolymer (R-PP) comprises, especially consists of, monomers copolymerizable with propylene from the group consisting of ethylene, 1-butene and 1-hexene. More specifically the random propylene copolymer (R-PP) of this invention comprises—apart from propylene—units derivable from ethylene and/or 1-butene. In a preferred embodiment, the random propylene copolymer (R-PP) comprises units derivable from ethylene and propylene only.

Additionally, it is appreciated that the random propylene copolymer (R-PP) has preferably a comonomer content in the range of more than 1.0 to 10.0 wt.-%, more preferably in the range of more than 1.5 to 9.0 wt.-%, yet more preferably in the range of 2.0 to 8.0 wt.-%. The weight percentage is based on the total weight of the random propylene copolymer (R-PP).

In one embodiment, the comonomers of the random propylene copolymer (R-PP) and/or the comonomers of the elastomeric propylene copolymer (E) are the same and are ethylene and/or $C_4$ to $C_8$ α-olefins, preferably ethylene and/or 1-butene and/or 1-hexene, especially ethylene.

The term "random" indicates that the comonomers of the random propylene copolymer (R-PP), as well as of the propylene copolymer (R-PP) are randomly distributed within the propylene copolymers. The term random is understood according to IUPAC (Glossary of basic terms in polymer science; IUPAC recommendations 1996).

Preferably, the matrix (M) is a random propylene copolymer (R-PP). Thus, the heterophasic propylene copolymer preferably comprises, more preferably consists of, 20.0 to 80.0 wt.-%, preferably 30.0 to 70.0 wt.-%, of the random propylene copolymer (R-PP) and 20.0 to 80.0 wt.-%, preferably 30.0 to 70.0 wt.-%, of the elastomeric propylene copolymer (E), based on the total weight of the heterophasic propylene copolymer.

According to step a) of the present process, a solid Ziegler-Natta catalyst component being free of phthalic compounds is provided.

In one embodiment, the solid Ziegler-Natta catalyst component of step a) thus comprises (a1) a compound of a transition metal (TM), which transition metal is selected from one of the groups 4 to 6 of the periodic table (IUPAC), preferably a titanium compound, (a2) a compound of a metal (M) which metal is selected from one of the groups 1 to 3 of the periodic table (IUPAC), preferably a metal of group 2 of the periodic table (IUPAC), more preferably a magnesium compound, and (a3) an internal donor (ID) being a non-phthalic compound, preferably a non-phthalic acid ester selected from optionally substituted malonates, maleates, succinates, glutarates, cyclohexene-1,2-dicarboxylates, citraconates, benzoates and derivatives and/or mixtures thereof, preferably the internal donor (ID) is a citraconate.

Further, the solid catalyst is free of any external support material, like silica or $MgCl_2$, which means that the solid Ziegler-Natta catalyst component is prepared without adding any external carrier or support material to the catalyst synthesis.

The Ziegler-Natta catalyst (ZN-C) can be further defined by the way as obtained.

Accordingly, the Ziegler-Natta catalyst (ZN-C) is preferably obtained by a process comprising the steps of i)

$i_1$) providing a solution of at least a Group 1 to 3 metal alkoxy compound, being the reaction product of a Group 1 to 3 metal compound (M) and an alcohol (A) comprising in addition to the hydroxyl moiety at least one ether moiety optionally in an organic liquid reaction medium, preferably a solution of at least a Group 2 metal alkoxy compound (Ax), being the reaction product of a Group 2 metal compound (M) and an alcohol (A) comprising in addition to the hydroxyl moiety at least one ether moiety optionally in an organic liquid reaction medium;

or $i_2$) providing a solution of at least a Group 1 to 3 metal alkoxy compound (Ax') being the reaction product of a Group 1 to 3 metal compound (M) and an alcohol mixture of the alcohol (A) and a monohydric alcohol (B) of formula ROH, optionally in an organic liquid reaction medium, preferably a solution of at least a Group 2 metal alkoxy compound (Ax') being the reaction product of a Group 2 metal compound (M) and an alcohol mixture of the alcohol (A) and a monohydric alcohol (B) of formula ROH, optionally in an organic liquid reaction medium;

or i$_3$) providing a solution of a mixture of the Group 1 to 3 alkoxy compound (Ax) and a Group 1 to 3 metal alkoxy compound (Bx) being the reaction product of a Group 1 to 3 metal compound (M) and the monohydric alcohol (B), optionally in an organic liquid reaction medium, preferably a solution of a mixture of the Group 2 alkoxy compound (Ax) and a Group 2 metal alkoxy compound (Bx) being the reaction product of a Group 2 metal compound (M) and the monohydric alcohol (B), optionally in an organic liquid reaction medium; and ii) adding said solution from step a) to at least one compound of a transition metal of Group 4 to 6 (TM) and iii) obtaining the solid catalyst component particles, and adding a non-phthalic internal electron donor (ID) at any step prior to step iii).

The internal donor (ID) or precursor thereof is preferably added to the solution of step i) or to the solution of a transition metal compound before step ii) or after completing step ii). Thus, it is essential that all catalyst compounds are contacted in solution form before the solid particles are formed.

According to the procedure above the Ziegler-Natta catalyst (ZN-C) can be obtained via precipitation method or via emulsion (liquid/liquid two-phase system)-solidification method depending on the physical conditions, especially temperature used in steps ii) and iii). Thus, the solid Ziegler-Natta catalyst component is prepared without adding any external carrier or support material to the catalyst synthesis.

In both methods (precipitation or emulsion-solidification) the catalyst chemistry is the same.

In precipitation method combination of the solution of step a) with at least one transition metal compound (TM) in step b) is carried out and the whole reaction mixture is kept at least at 50° C., more preferably in the temperature range of 55 to 110° C., more preferably in the range of 70 to 100° C., to secure full precipitation of the catalyst component in form of a solid particles (step c).

In emulsion-solidification method in step ii) the solution of step i) is typically added to the at least one transition metal compound (TM) at a lower temperature, such as from −10 to below 50° C., preferably from −5 to 30° C. During agitation of the emulsion the temperature is typically kept at −10 to below 40° C., preferably from −5 to 30° C. Droplets of the dispersed phase of the emulsion form the active catalyst composition. Solidification (step iii) of the droplets is suitably carried out by heating the emulsion to a temperature of 70 to 150° C., preferably to 80 to 110° C.

The catalyst prepared by emulsion-solidification method is preferably used in the present invention.

In a preferred embodiment, in step i) the solution of i$_2$) or i$_3$) are used, i.e. a solution of (Ax') or a solution of a mixture of (Ax) and (Bx).

Preferably the Group 2 metal (M) is magnesium.

The magnesium alkoxy compounds (Ax), (Ax') and (Bx) can be prepared in situ in the first step of the catalyst preparation process, step a), by reacting the magnesium compound with the alcohol(s) as described above, or said magnesium alkoxy compounds can be separately prepared magnesium alkoxy compounds or they can be even commercially available as ready magnesium alkoxy compounds and used as such in the catalyst preparation process of the invention.

Illustrative examples of alcohols (A) are monoethers of dihydric alcohols (glycol monoethers). Preferred alcohols (A) are $C_2$ to $C_4$ glycol monoethers, wherein the ether moieties comprise from 2 to 18 carbon atoms, preferably from 4 to 12 carbon atoms. Preferred examples are 2-(2-ethylhexyloxy)ethanol, 2-butyloxy ethanol, 2-hexyloxy ethanol and 1,3-propylene-glycol-monobutyl ether, 3-butoxy-2-propanol, with 2-(2-ethylhexyloxy)ethanol and 1,3-propylene-glycol-monobutyl ether, 3-butoxy-2-propanol being particularly preferred.

Illustrative monohydric alcohols (B) are of formula ROH, with R being linear or branched $C_6$-$C_{10}$ alkyl residue. The most preferred monohydric alcohol is 2-ethyl-1-hexanol or octanol.

Preferably a mixture of Mg alkoxy compounds (Ax) and (Bx) or mixture of alcohols (A) and (B), respectively, are used and employed in a mole ratio of Bx:Ax or B:A from 8:1 to 2:1, more preferably 5:1 to 3:1.

Magnesium alkoxy compound may be a reaction product of alcohol(s), as defined above, and a magnesium compound selected from dialkyl magnesiums, alkyl magnesium alkoxides, magnesium dialkoxides, alkoxy magnesium halides and alkyl magnesium halides. Alkyl groups can be a similar or different $C_1$-$C_{20}$ alkyl, preferably $C_2$-$C_{10}$ alkyl. Typical alkyl-alkoxy magnesium compounds, when used, are ethyl magnesium butoxide, butyl magnesium pentoxide, octyl magnesium butoxide and octyl magnesium octoxide. Preferably the dialkyl magnesiums are used. Most preferred dialkyl magnesiums are butyl octyl magnesium or butyl ethyl magnesium.

It is also possible that magnesium compound can react in addition to the alcohol (A) and alcohol (B) also with a polyhydric alcohol (C) of formula R" $(OH)_m$ to obtain said magnesium alkoxide compounds. Preferred polyhydric alcohols, if used, are alcohols, wherein R" is a linear, cyclic or branched $C_2$ to $C_{10}$ hydrocarbon residue, and m is an integer of 2 to 6.

The magnesium alkoxy compounds of step i) are thus selected from the group consisting of magnesium dialkoxides, diaryloxy magnesiums, alkyloxy magnesium halides, aryloxy magnesium halides, alkyl magnesium alkoxides, aryl magnesium alkoxides and alkyl magnesium aryloxides. In addition a mixture of magnesium dihalide and a magnesium dialkoxide can be used.

The solvents to be employed for the preparation of the present catalyst may be selected among aromatic and aliphatic linear, branched and cyclic hydrocarbons with 5 to 20 carbon atoms, more preferably 5 to 12 carbon atoms, or mixtures thereof. Suitable solvents include benzene, toluene, cumene, xylene, pentane, hexane, heptane, octane and nonane. Hexanes and pentanes are particular preferred.

Mg compound is typically provided as a 10 to 50 wt-% solution in a solvent as indicated above. Typical commercially available Mg compound, especially dialkyl magnesium solutions are 20-40 wt-% solutions in toluene or heptanes.

The reaction for the preparation of the magnesium alkoxy compound may be carried out at a temperature of 40° C. to 70° C. Most suitable temperature is selected depending on the Mg compound and alcohol(s) used.

The transition metal compound of Group 4 to 6 is preferably a titanium compound, most preferably a titanium halide, like $TiCl_4$.

The internal donor (ID) used in the preparation of the catalyst used in the present invention is preferably selected from substituted maleates and citraconates. Most preferably the internal donor is citraconate.

In emulsion method, the two phase liquid-liquid system may be formed by simple stirring and optionally adding (further) solvent(s) and additives, such as the turbulence minimizing agent (TMA) and/or the emulsifying agents and/or emulsion stabilizers, like surfactants, which are used in a manner known in the art for facilitating the formation of and/or stabilize the emulsion. Preferably, surfactants are acrylic or methacrylic polymers. Particular preferred are unbranched $C_{12}$ to $C_{20}$ (meth)acrylates such as poly(hexadecyl)-methacrylate and poly(octadecyl)-methacrylate and mixtures thereof. Turbulence minimizing agent (TMA), if used, is preferably selected from α-olefin polymers of α-olefin monomers with 6 to 20 carbon atoms, like polyoctene, polynonene, polydecene, polyundecene or polydodecene or mixtures thereof. Most preferable it is polydecene.

The solid particulate product obtained by precipitation or emulsion-solidification method may be washed at least three times, more preferably at least five times with aromatic and/or aliphatic hydrocarbons, preferably with toluene, heptane or pentane and/or with $TiCl_4$. Washing solutions may also contain donors and/or compounds of Group 13, like trialkyl aluminium, halogenated alkyl aluminium compounds, alkyl alkoxy aluminium compounds or halogenated alkyl alkoxy aluminium compounds. Aluminium compounds can also be added during the catalyst synthesis.

The catalyst can further be dried, e.g. by evaporation or flushing with nitrogen, or it can be slurried to an oily liquid without any drying step.

The solid catalyst component prepared by emulsion-solidification method is in the form of spherical particles with a low surface area. Further, these catalysts particles may be featured by a uniform distribution of catalytically active sites thorough the catalyst particles.

The finally obtained Ziegler-Natta catalyst is desirably in the form of particles having generally an average particle size range of 5 to 200 μm, preferably 10 to 100. Particles are compact with low porosity and have surface area below 20 $g/m^2$, more preferably below 10 $g/m^2$. Typically the amount of Ti is 1 to 6 wt.-%, Mg 10 to 20 wt.-% and donor 10 to 40 wt-% of the catalyst composition.

Detailed description of the preparation of catalysts is disclosed in WO 2012/007430, EP 2 415 790, EP 2 610 270, EP 2 610 271 and EP 2 610 272 which are incorporated here by reference.

According to the process of the present invention in step b) of the present process, the solid Ziegler-Natta catalyst component of step a) is subjected into a batch mode catalyst prepolymerization step, wherein the solid Ziegler-Natta catalyst component is prepolymerized in the presence of at least one olefin monomer(s) selected from olefin monomers of 2 to 4 carbon atoms or mixtures thereof in the presence of an external electron donor (ED) to obtain a prepolymerized solid Ziegler-Natta catalyst.

The expression at least olefin monomer(s)" means that one or two or three different olefin monomer(s) selected from olefin monomers of 2 to 4 carbon atoms may be used in process step b). According to a preferred embodiment, only one olefin monomer selected from olefin monomers of 2 to 4 carbon atoms is used in step b).

According to a preferred embodiment of the present invention, the one or more olefin monomer(s) selected from olefin monomers of 2 to 4 carbon atoms is/are selected from ethylene, propylene, 1-butene and mixtures thereof. Preferably, one of the selected monomers is used.

More preferably, the one or more olefin monomer(s) selected from olefin monomers of 2 to 4 carbon atoms is 1-butene.

In one embodiment, it is preferred that the weight ratio of the one or more olefin monomer(s) to the solid Ziegler-Natta catalyst component (olefin monomer/solid Ziegler-Natta catalyst component) of the prepolymerized catalyst obtained in step b) is in the range of 0.5 to 50. Preferably, the weight ratio of the one or more olefin monomer(s) to the solid Ziegler-Natta catalyst component (olefin monomer/solid Ziegler-Natta catalyst component) obtained in step b) is in the range of 1 to 20, more preferably in the range of 1.5 to 10.

In case a 100% conversion is obtained then the wt.-ratio of the olefin and catalyst fed to step b) are the same as in the final batch-mode prepolymerized catalyst.

The external donor (ED) selected from external donors as defined in connection with the batch-mode prepolymerization step may be added to the process prepolymerization step or to any of actual polymerization reactors, if desired. However, when the process of the present invention is used, adding the external electron donor into the process preplymerization step and/or to the actual polymerization reactors can be avoided, and thus use of extra chemicals can be reduced.

It is appreciated that the catalyst batch-mode prepolymerization step b) is carried out in the presence of a co-catalyst (Co) being a compound of group 13 metal, more preferably an Al compound.

The co-catalyst (Co) is preferably a compound of group 13 of the periodic table (IUPAC), e.g. organo aluminum, such as an aluminum compound, like aluminum alkyl, aluminum halide or aluminum alkyl halide compound. Accordingly, in one specific embodiment the co-catalyst (Co) is a trialkylaluminium, like triethylaluminium (TEAL), dialkyl aluminium chloride or alkyl aluminium dichloride or mixtures thereof. In one specific embodiment the co-catalyst (Co) is triethylaluminium (TEAL).

The actual polymerization process is preferably conducted in the presence of a cocatalyst, as defined above. If the polymerization process configuration comprises a process prepolymerization step, the cocatalyst is fed to said process prepolymerization step c0 and optionally to the actual polymerization step c).

Preferably, the mol ratio of co-catalyst (Co) to the external electron donor (ED) [Co/ED] is in the range of 0.30 to 1.5, preferably in the range of 0.5 to 1.2 in step b).

Additionally or alternatively, the mol ratio of the co-catalyst (Co) to the compound of a transition metal (TM) [Co/TM] is in the range of 0.5 to 10, preferably in the range of 0.5 to 5.0, more preferably 0.7 to 3.0 in step b).

In one embodiment, the mol ratio of co-catalyst (Co) to the external electron donor (ED) [Co/ED] is in the range of 0.30 to 1.5, preferably in the range of 0.5 to 1.2, and the mol ratio of the co-catalyst (Co) to the compound of a transition metal (TM) [Co/TM] is in the range of 0.5 to 10, preferably in the range of 0.5 to 5.0, more preferably 0.7 to 3.0 in step b).

Batch-mode prepolymerization step b) is preferably conducted in a medium.

The medium is preferably an oil or a hydrocarbon solvent.

If the medium is an oil, the oil is preferably selected such that the viscosity of the solid Ziegler-Natta catalyst/medium mixture is sufficiently high to prevent the catalyst particles from settling during transport and feeding into process step c). Such viscous substance can be an oil or a mixture of an oil with a solid or highly viscous substance (oil-grease). The viscosity of such a medium is usually 1 000 to 15 000 cP at room temperature.

Alternatively, the medium is a hydrocarbon solvent. The hydrocarbon solvent to be employed in prepolymerization step b) may be selected among aromatic and aliphatic linear, branched and cyclic hydrocarbons with 5 to 20 carbon atoms, more preferably 5 to 12 carbon atoms, or mixtures thereof. Suitable hydrocarbon solvents include benzene, toluene, cumene, xylene, pentane, hexane, heptane, octane and nonane. Hexanes and pentanes are particular preferred.

In one embodiment, batch-mode prepolymerization step b) is carried out under an inert gas atmosphere such as under nitrogen atmosphere.

Additionally or alternatively, batch-mode prepolymerization step b) is carried out at a temperature ranging from 20 to 40° C., preferably from 20 to 35° C. and most preferably from 25 to 30° C.

According to step c) of the present process, propylene and optionally ethylene and/or a $C_4$ to $C_8$ α-olefin is polymerized in one or more polymerization reactor(s) in the presence of the prepolymerized solid Ziegler-Natta catalyst of step b), forming the first propylene homo- or copolymer. As indicated above, the polymerization process may comprise a process prepolymerization step after step b), but before step c).

As already mentioned, the heterophasic propylene copolymer according to this invention comprises a matrix (M) being a propylene homopolymer (H-PP) or a random propylene copolymer (R-PP), preferably a random propylene copolymer (R-PP), and dispersed therein an elastomeric propylene copolymer (E).

That is to say, in polymerization step c) the matrix (M) being a propylene homopolymer (H-PP) or a random propylene copolymer (R-PP), preferably a random propylene copolymer (R-PP), of the heterophasic propylene copolymer is produced.

In one embodiment, the polymer produced in step c) is preferably a propylene ethylene random copolymer.

The matrix (M) being a propylene homopolymer (H-PP) or a random propylene copolymer (R-PP), preferably a random propylene copolymer (R-PP), of the heterophasic propylene copolymer produced in process step c) of the present invention can have a unimodal or bimodal molar mass. Thus, the equipment used for polymerization step c) can comprise any polymerization reactors of conventional design for producing propylene homo- or copolymers.

In view of this, the polymerization step c) is conducted in one or more polymerization reactor(s). Preferably, the polymerization reactor system can comprise one or more conventional stirred-tank slurry reactors, as described in WO 94/26794, or one or more gas phase reactors or a combination of a stirred-tank slurry reactor and a gas phase reactor.

For the purpose of the present invention, "slurry reactor" designates any reactor, such as a continuous or simple batch stirred tank reactor or loop reactor, operating in bulk or slurry and in which the polymer forms in particulate form. "Bulk" means a polymerization in reaction medium that comprises at least 60 wt.-% monomer. According to a preferred embodiment the slurry reactor comprises a loop reactor. By "gas phase reactor" is meant any mechanically mixed or fluid bed reactor. Preferably the gas phase reactor comprises a mechanically agitated fluid bed reactor with gas velocities of at least 0.2 msec.

In one embodiment, the polymerization step c) is conducted in at least one slurry reactor, preferably a loop reactor.

The gas phase reactor can be an ordinary fluidized bed reactor, although other types of gas phase reactors can be used. In a fluidized bed reactor, the bed consists of the formed and growing polymer particles as well as still active catalyst come along with the polymer fraction. The bed is kept in a fluidized state by introducing gaseous components, for instance monomer on such flowing rate, which will make the particles act as a fluid. The fluidizing gas can contain also inert carrier gases, like nitrogen and also hydrogen as a polymer molecular weight controlling agent. The fluidized gas phase reactor can be equipped with a mechanical mixer.

The gas phase reactor used can be operated in the temperature range of 50 to 100° C., preferably between 65 and 90° C. and the pressure is suitably from 10 to 40 bar, preferably from 15 to 30 bar.

A preferred embodiment of the invention comprises carrying out the polymerization step c) in a process comprising loop and gas phase reactors in a cascade where the loop reactor operates in liquid propylene. The temperature in the polymerization in the loop reactor is typically from 50 to 110° C., preferably from 60 to 100° C. and in particular from 65 to 95° C. The pressure is from 1 to 150 bar, preferably from 10 to 100 bar.

It is possible to have a flash between loop and gas phase reactors.

In addition to the actual polymerization reactors used for producing the propylene homo- or copolymer, the polymerization reaction system can also include a number of additional reactors, such as pre- and/or postreactors, as typically used and being well known in the art.

It is appreciated that the amount of polymer produced in step c) is in the range of 50 to 90 wt.-%, preferably 60 to 80 wt.-% based on the total amount of the heterophasic propylene copolymer produced in the process.

One advantage of the implementation of prepolymerization step b) in the process of the present invention is that no additional external electron donor (ED) must be added into polymerization step c). Thus, it is preferred that no additional external electron donor (ED) is added into polymerization step c). It is also appreciated that no additional external electron donor (ED) is added into the process prepolymerization step preceding the polymerisation step c), but only to the batch-mode prepolymerization step b).

According to step d) of the present process, the first propylene homo- or copolymer propylene is polymerized in one or more further polymerization reactor(s) in the presence of ethylene and optionally a $C_4$ to $C_8$ α-olefin, obtaining the heterophasic propylene copolymer.

That is to say, in polymerization step d) the elastomeric propylene copolymer (E) dispersed in the matrix (M) being a propylene homopolymer (H-PP) or a random propylene copolymer (R-PP), preferably a random propylene copolymer (R-PP), of the heterophasic propylene copolymer is produced. Thus, the polymer produced in step d) forms the elastomeric part of the heterophasic propylene copolymer.

It is appreciated that the amount of polymer produced in step d) is in the range of 20 to 80 wt.-%, preferably 30 to 70 wt.-%, based on the total amount of the heterophasic propylene copolymer produced in the process.

Thus, the amount of polymer produced in step c) is in the range of 20 to 80 wt.-%, preferably 30 to 70 wt.-% based on the total amount of the heterophasic propylene copolymer produced in the process and the amount of polymer produced in step d) is in the range of 20 to 80 wt.-%, preferably 30 to 70 wt.-%, based on the total amount of the heterophasic propylene copolymer produced in the process.

The equipment used for polymerization step d) can comprise any polymerization reactors of conventional design for producing the elastomeric part of a heterophasic propylene copolymer.

In view of this, the polymerization step d) is conducted in one or more polymerization reactor(s). Preferably, the polymerization reactor system comprises one or more gas phase reactors.

Similar descriptions of the gas phase reactor(s) used in step c) apply for the gas phase reactor(s) of step d) polymerization.

One advantage of the implementation of batch-mode prepolymerization step b) in the process of the present invention is that no additional external electron donor (ED) must be added into polymerization step d). Thus, it is preferred that no additional external electron donor (ED) is added into polymerization step d).

In one preferred embodiment, no additional external electron donor (ED) is added into polymerisation steps c) and d). In a more preferred embodiment, no additional external electron donor (ED) is added into the process prepolymerization step, polymerization steps c) and d).

The heterophasic propylene copolymer produced by the process of the present invention may be pelletized and compounded using any of the variety of compounding and blending methods well known and commonly used in the resin compounding art.

In view of the above, the present invention is also directed to the heterophasic propylene copolymer produced by the process.

The present invention is further directed to an article comprising the heterophasic propylene copolymer produced by the process of the present invention. For example, the article is a film comprising the heterophasic propylene copolymer. Alternatively, the article is a flexible tube comprising the heterophasic propylene copolymer. Alternatively, the article is a cable insulation comprising the heterophasic propylene copolymer.

In the following the present invention is further illustrated by means of examples.

EXAMPLES

1. Measuring Methods

The following definitions of terms and determination methods apply for the above general description of the invention as well as to the below examples unless otherwise defined.

Calculation of comonomer content of the second propylene copolymer fraction (R-PP2):

$$\frac{C(PP) - w(PP1) \times C(PP1)}{w(PP2)} = C(PP2) \quad (I)$$

wherein
w(PP1) is the weight fraction [in wt.-%] of the first propylene copolymer fraction (R-PP1),
w(PP2) is the weight fraction [in wt.-%] of second propylene copolymer fraction (R-PP2),
C(PP1) is the comonomer content [in mol-%] of the first propylene copolymer fraction (R-PP1),
C(PP) is the comonomer content [in mol-%] of the random propylene copolymer (R-PP),
C(PP2) is the calculated comonomer content [in mol-%] of the second propylene copolymer fraction (R-PP2).

Calculation of the xylene cold soluble (XCS) content of the second propylene copolymer fraction (R-PP2):

$$\frac{XS(PP) - w(PP1) \times XS(PP1)}{w(PP2)} = XS(PP2) \quad (II)$$

wherein
w(PP1) is the weight fraction [in wt.-%] of the first propylene copolymer fraction (R-PP1),
w(PP2) is the weight fraction [in wt.-%] of second propylene copolymer fraction (R-PP2),
XS(PP1) is the xylene cold soluble (XCS) content [in wt.-%] of the first propylene copolymer fraction (R-PP1),
XS(PP) is the xylene cold soluble (XCS) content [in wt.-%] of the random propylene copolymer (R-PP),
XS(PP2) is the calculated xylene cold soluble (XCS) content [in wt.-%] of the second propylene copolymer fraction (R-PP2), respectively.

Calculation of melt flow rate $MFR_2$ (230° C./2.16 kg) of the second propylene copolymer fraction (R-PP2):

$$MFR(PP2) = 10^{\left[\frac{\log(MFR(PP)) - w(PP1) \times \log(MFR(PP1))}{w(PP2)}\right]} \quad (III)$$

wherein
w(PP1) is the weight fraction [in wt.-%] of the first propylene copolymer fraction (R-PP1),
w(PP2) is the weight fraction [in wt.-%] of second propylene copolymer fraction (R-PP2),
MFR(PP1) is the melt flow rate $MFR_2$ (230° C./2.16 kg) [in g/10 min] of the first propylene copolymer fraction (R-PP1),
MFR(PP) is the melt flow rate $MFR_2$ (230° C./2.16 kg) [in g/10 min] of the random propylene copolymer (R-PP),
MFR(PP2) is the calculated melt flow rate $MFR_2$ (230° C./2.16 kg) [in g/10 min] of the second propylene copolymer fraction (R-PP2).

Calculation of comonomer content of the elastomeric propylene copolymer (E), respectively:

$$\frac{C(RAHECO) - w(PP) \times C(PP)}{w(E)} = C(E) \quad (IV)$$

wherein
w(PP) is the weight fraction [in wt.-%] of the random propylene copolymer (R-PP), i.e. polymer produced in the first and second reactor (R1+R2),
w(E) is the weight fraction [in wt.-%] of the elastomeric propylene copolymer (E), i.e. polymer produced in the third reactor (R3)
C(PP) is the comonomer content [in mol-%] of the random propylene copolymer (R-PP), i.e. comonomer content [in mol-%] of the polymer produced in the first and second reactor (R1+R2),
C(RAHECO) is the comonomer content [in mol-%] of the propylene copolymer, i.e. is the comonomer content [in mol-%] of the polymer obtained after polymerization in the third reactor (R3), C(E) is the calculated comonomer content [in mol-%] of elastomeric propylene copolymer (E), i.e. of the polymer produced in the third reactor (R3).

MFR$_2$ (230° C./2.16 kg) is measured according to ISO 1133 at 230° C. and 2.16 kg load.

Quantification of Microstructure by NMR Spectroscopy

Quantitative nuclear-magnetic resonance (NMR) spectroscopy was used to quantify the comonomer content and comonomer sequence distribution of the polymers. Quantitative $^{13}$C{$^1$H} NMR spectra were recorded in the solution-state using a Bruker Advance III 400 NMR spectrometer operating at 400.15 and 100.62 MHz for $^1$H and $^{13}$C respectively. All spectra were recorded using a $^{13}$C optimised 10 mm extended temperature probehead at 125° C. using nitrogen gas for all pneumatics. Approximately 200 mg of material was dissolved in 3 ml of 1,2-tetrachloroethane-d$_2$ (TCE-d$_2$) along with chromium-(III)-acetylacetonate (Cr(acac)$_3$) resulting in a 65 mM solution of relaxation agent in solvent (Singh, G., Kothari, A., Gupta, V., Polymer Testing 28 5 (2009), 475). To ensure a homogenous solution, after initial sample preparation in a heat block, the NMR tube was further heated in a rotatary oven for at least 1 hour. Upon insertion into the magnet the tube was spun at 10 Hz. This setup was chosen primarily for the high resolution and quantitatively needed for accurate ethylene content quantification. Standard single-pulse excitation was employed without NOE, using an optimised tip angle, 1 s recycle delay and a bi-level WALTZ16 decoupling scheme (Zhou, Z., Kuemmerle, R., Qiu, X., Redwine, D., Cong, R., Taha, A., Baugh, D. Winniford, B., J. Mag. Reson. 187 (2007) 225; Busico, V., Carbonniere, P., Cipullo, R., Pellecchia, R., Severn, J., Talarico, G., Macromol. Rapid Commun. 2007, 28, 1128). A total of 6144 (6k) transients were acquired per spectra.

Quantitative $^{13}$C{$^1$H} NMR spectra were processed, integrated and relevant quantitative properties determined from the integrals using proprietary computer programs. All chemical shifts were indirectly referenced to the central methylene group of the ethylene block (EEE) at 30.00 ppm using the chemical shift of the solvent. This approach allowed comparable referencing even when this structural unit was not present. Characteristic signals corresponding to the incorporation of ethylene were observed Cheng, H. N., Macromolecules 17 (1984), 1950).

With characteristic signals corresponding to 2,1 erythro regio defects observed (as described in L. Resconi, L. Cavallo, A. Fait, F. Piemontesi, Chem. Rev. 2000, 100 (4), 1253, in Cheng, H. N., Macromolecules 1984, 17, 1950, and in W-J. Wang and S. Zhu, Macromolecules 2000, 33 1157) the correction for the influence of the regio defects on determined properties was required. Characteristic signals corresponding to other types of regio defects were not observed.

The comonomer fraction was quantified using the method of Wang et. al. (Wang, W-J., Zhu, S., Macromolecules 33 (2000), 1157) through integration of multiple signals across the whole spectral region in the $^{13}$C{$^1$H} spectra. This method was chosen for its robust nature and ability to account for the presence of regio-defects when needed. Integral regions were slightly adjusted to increase applicability across the whole range of encountered comonomer contents.

For systems where only isolated ethylene in PPEPP sequences was observed the method of Wang et. al. was modified to reduce the influence of non-zero integrals of sites that are known to not be present. This approach reduced the overestimation of ethylene content for such systems and was achieved by reduction of the number of sites used to determine the absolute ethylene content to:

$$E=0.5(S\beta\beta+S\beta\gamma+S\beta\delta+0.5(S\alpha\beta+S\alpha\gamma))$$

Through the use of this set of sites the corresponding integral equation becomes:

$$E=0.5(I_H+I_G+0.5(I_C+I_D))$$

using the same notation used in the article of Wang et. al. (Wang, W-J., Zhu, S., Macromolecules 33 (2000), 1157). Equations used for absolute propylene content were not modified.

The mole percent comonomer incorporation was calculated from the mole fraction:

$$E \text{ [mol \%]}=100*fE$$

The weight percent comonomer incorporation was calculated from the mole fraction:

$$E \text{ [wt \%]}=100*(fE*28.06)/((fE*28.06)+((1-fE)*42.08))$$

The comonomer sequence distribution at the triad level was determined using the analysis method of Kakugo et al. (Kakugo, M., Naito, Y., Mizunuma, K., Miyatake, T. Macromolecules 15 (1982) 1150). This method was chosen for its robust nature and integration regions slightly adjusted to increase applicability to a wider range of comonomer contents.

The relative content of isolated to block ethylene incorporation was calculated from the triad sequence distribution using the following relationship (equation (I)):

$$I(E) = \frac{fPEP}{(fEEE + fPEE + fPEP)} \times 100 \qquad \text{(I)}$$

wherein

I(E) is the relative content of isolated to block ethylene sequences [in %];

fPEP is the mol fraction of propylene/ethylene/propylene sequences (PEP) in the sample;

fPEE is the mol fraction of propylene/ethylene/ethylene sequences (PEE) and of ethylene/ethylene/propylene sequences (EEP) in the sample;

fEEE is the mol fraction of ethylene/ethylene/ethylene sequences (EEE) in the sample.

Intrinsic viscosity is measured according to DIN ISO 1628/1, October 1999 (in Decalin at 135° C.).

The xylene cold solubles (XCS, wt.-%): Content of xylene cold solubles (XCS) is determined at 25° C. according ISO 16152; first edition; 2005 Jul. 1. The part which remains insoluble is the xylene cold insoluble (XCI) fraction.

2. Examples

The catalysts used in the polymerization processes for the heterophasic propylene copolymers of the present invention were prepared as follows:

Reference Catalyst

Preparation of the solid catalyst component

Used Chemicals:

TiCl$_4$ (CAS 7550-45-90) was supplied by commercial source.

20% solution in toluene of butyl ethyl magnesium (Mg (Bu)(Et)), provided by Crompton 2-ethylhexanol, provided by Merck Chemicals 3-Butoxy-2-propanol, provided by Sigma-Aldrich
bis(2-ethylhexyl)citraconate, provided by Contract Chemicals
Viscoplex® 1-254, provided by Evonik
Heptane, provided by Chevron Preparation of Mg Complex 3.4 litre of 2-ethylhexanol and 810 ml of propylene glycol butyl monoether in a molar ratio 4/1) were added to a 20% reactor. Then, 7.8 litre of a 20% solution in toluene of BEM (butyl ethyl magnesium) provided by Crompton GmbH was slowly added to the well stirred alcohol mixture. During the addition, the temperature was kept at 10° C. After addition, the temperature of the reaction mixture was raised to 60° C. and mixing was continued at this temperature for 30 minutes. Finally, after cooling to room temperature the obtained Mg-alkoxide was transferred to a storage vessel.

21.2 g of Mg alkoxide prepared above was mixed with 4.0 ml bis(2-ethylhexyl) citraconate for 5 min. After mixing the obtained Mg complex was used immediately in the preparation of catalyst component.

Preparation of the Solid Catalyst Component 19.5 ml titanium tetrachloride was placed in a 300 ml reactor equipped with a mechanical stirrer at 25° C. Mixing speed was adjusted to 170 rpm. 26.0 of Mg-complex prepared above was added within 30 minutes keeping the temperature at 25° C. 3.0 ml of Viscoplex 1-254 and 24.0 ml of heptane were added to form an emulsion. Mixing was continued for 30 minutes at 25° C. Then, the reactor temperature was raised to 90° C. within 30 minutes. The reaction mixture was stirred for further 30 minutes at 90° C. Afterwards, stirring was stopped and the reaction mixture was allowed to settle for 15 minutes at 90° C.

The solid material was washed with 100 ml of toluene, with of 30 ml of TiCl4, with 100 ml of toluene and two times with 60 ml of heptane. 1 ml of donor was added to the two first washings. Washings were made at 80° C. under stirring 30 min with 170 rpm. After stirring was stopped, the reaction mixture was allowed to settle for 20-30 minutes and followed by siphoning.

Afterwards, stirring was stopped and the reaction mixture was allowed to settle for 10 minutes decreasing the temperature to 70° C. with subsequent siphoning, and followed by $N_2$ sparging for 20 minutes to yield an air sensitive powder.

Catalyst has a surface area measured by BET method below 5 $m^2$/g, i.e. below the detection limit. Ti content was 2.6 wt-%.

Inventive Catalyst

The catalyst of the Reference Catalyst was batch-mode prepolymerised with 1-butene in the presence of dicyclopentyl dimethoxy silane as the external donor (ED) and cocatalyst (TEAL) in a catalyst vessel under nitrogen blanket at a temperature of 20-30° C. with Al/Ti molar ratio of 1 and Al/ED molar ratio of 0.75. The weight ratio of 1-butene/catalyst in the vessel was 2/1 resulting in a batch-mode prepolymerized catalyst with a polymerization degree of 2 g polymer/1 g catalyst (100% conversion).

Comparative Example 1

The catalyst prepared according to the Reference catalyst was used as such (=comparative catalyst) along with tri-ethyl-aluminium (TEAL) as co-catalyst and dicyclopentyl dimethoxy silane as external donor (ED) in the polymerization process. Polymerisation conditions and results are disclosed in Table 1.

Reference Example—Propylene Homopolymerization

The inventive catalyst was used in a process for producing a propylene homopolymer in a process comprising a process prepolymerization step, polymerization in a loop reactor followed by polymerization in a gas phase reactor. No comonomers were added into the process and no external donor was used. Conditions and results are disclosed in Table 1.

Inventive Example 1

The actual polymerization of propylene with ethylene to produce the heterophasic propylene copolymer was carried out using the Inventive catalyst without an external donor. Conditions and results are disclosed in Table 1.

Based on the XCS of reference example (homoPP), it has been simulated how much the XCS would increase if there is no external donor present in the polymerisation process for producing heterophasic polymerisation using Inventive catalyst.

TABLE 1

| | Conditions and results | | | |
|---|---|---|---|---|
| | Example | Comparative Example 1 heterophasic PP | Inventive Example 1 heterophasic PP | Reference example homoPP |
| Prepolymerization | Catalyst | Comparative catalyst | Inventive catalyst | Inventive catalyst |
| | Catalyst feed g/h | 2 | 1.8 | 2.3 |
| | Cocatalyst, TEAL feed g/t C3 | 180 | 180 | 150 |
| | ED feed g/t C3 | 20 | No feed | No feed |
| | B1 Temperature (° C.) | 30 | 30 | 30 |
| | B1 Residence time (h) | 0.33 | 0.33 | 0.33 |
| Loop | B2 Temperature (° C.) | 70 | 70 | 80 |
| | B2 H2/C3 ratio (mol/kmol) | 0.9 | 0.9 | 0.5 |
| | B2 C2/C3 ratio (mol/kmol) | 4.2 | 4.0 | 0 |
| | B2 Split % | 37 | 35 | 65 |
| | B2 MFR2 (g/10 min) | 6.9 | 7.5 | 6.9 |
| | B2 XCS (%) | 6.8 | 8 | 5.0 |
| | B2 C2 content (%) | 2.4 | 2.15 | 0 |

TABLE 1-continued

Conditions and results

|  |  | Comparative Example 1 heterophasic PP | Inventive Example 1 heterophasic PP | Reference example homoPP |
|---|---|---|---|---|
| GPR1 | B3 Temperature (° C.) | 80 | 80 | 80 |
|  | B3 H2/C3 ratio (mol/kmol) | 2.7 | 2.6 | 8.0 |
|  | B3 C2/C3 ratio (mol/kmol) | 45.3 | 46.6 | 0 |
|  | B3 Split % | 33 | 35 | 35 |
|  | B3 MFR2 (g/10 min) | 1.8 | 1.9 | 9.6 |
|  | B3 XCS (%) | 21.3 | 27.0 | 4.2 |
|  | B3 Ethene content (%) | 6.9 | 7.4 | 0 |
| GPR2 | B4 Temperature (° C.) | 70 | 70 | — |
|  | B4 C2/C3 ratio (mol/kmol) | 329.2 | 303.2 | — |
|  | B4 H2/C2 ratio (mol/kmol) | 79.3 | 85.7 | — |
|  | B4 Split % | 30 | 30 | — |
|  | B4 MFR2 (g/10 min) | 1.0 | 1.0 | — |
|  | B4 XCS (%) | 38.9 | 52.0 | — |
|  | B4 Ethene content (%) | 14.9 | 14.4 | — |
|  | B4 Viscosity of AM (dl/g) | 3.1 | 2.9 | — |
|  | B4 Ethene of AM (%) | 30.6 | 33 | — |
| Final product | PP Mixer MFR2 (g/10 min) | 1.0 | 1.0 | 9.8 |
|  | PP Mixer viscosity of AM (dl/g) | 3.0 | 3.0 | — |
|  | PP Mixer ethene content (%) | 14.8 | 14.6 | 0 |
|  | PP Mixer XCS (%) | 38.5 | 52.0 | 3.8 |
|  | PP Mixer BD | 376 | 361 | 425 |
|  | PP Mixer PSD avg | 0.7 | 0.8 | 0.8 |

As can be seen from the examples, using the batch-prepolymerized catalyst of the invention it is possible to produce heterophasic propylene-ethylene polymers with a similar ethylene content, but still having a higher XCS.

Because no external donor is needed in the actual polymerization stage (comprising also the process prepolymerization step) the polymer has higher purity as the compounds used as external donor, which is desired in some applications such as in food and in the mechanical field.

The invention claimed is:

1. A process for producing a heterophasic propylene copolymer (RAHECO) having a xylene cold soluble fraction (XCS) determined according to ISO 16152 (25° C.) of more than 30 wt %, the process comprising the steps of:
   a) providing a solid Ziegler-Natta catalyst component that is free of phthalic compounds,
   b) subjecting the solid Ziegler-Natta catalyst component of step a) to a batch mode catalyst prepolymerization step, wherein the solid Ziegler-Natta catalyst component is prepolymerized in the presence of one or more olefin monomer(s) selected from olefin monomers of 2 to 4 carbon atoms in the presence of an external electron donor (ED) to obtain a prepolymerized solid Ziegler-Natta catalyst,
   c) polymerizing in one or more polymerization reactor(s) propylene and optionally ethylene and/or a $C_4$ to $C_8$ α-olefin in the presence of the prepolymerized solid Ziegler-Natta catalyst of step b), forming a first propylene homo- or copolymer,
   d) polymerizing in one or more further polymerization reactor(s) in the presence of the first propylene homo- or copolymer propylene and ethylene and optionally a $C_4$ to $C_8$ α-olefin, to obtain the heterophasic propylene copolymer.

2. The process according to claim 1, wherein the solid Ziegler-Natta catalyst component of step a) comprises:
   (a1) a compound of a transition metal (TM), which transition metal is selected from one of groups 4 to 6 of the periodic table (IUPAC),
   (a2) a compound of a metal (M) which metal is selected from one of groups 1 to 3 of the periodic table (IUPAC), and
   (a3) an internal donor (ID) that is a non-phthalic compound.

3. The process according to claim 1, wherein the internal donor (ID) of the solid Ziegler-Natta catalyst component is selected from optionally substituted malonates, maleates, succinates, glutarates, cyclohexene-1,2-dicarboxylates, citraconates, benzoates or derivatives or mixtures thereof.

4. The process according to claim 1, wherein the solid Ziegler-Natta catalyst component is free of an external support material.

5. The process according to claim 1, wherein the batch mode catalyst prepolymerization is carried out in the presence of a co-catalyst (Co) that is a compound of Group 13 metal.

6. The process according to claim 5, wherein a mol ratio of:
   a) the co-catalyst (Co) to the external electron donor (ED) [Co/ED] is in a range of 0.30 to 1.5, and/or
   b) the co-catalyst (Co) to a compound of a transition metal (TM) [Co/TM] is in a range of 0.5 to 10.0 in the batch mode catalyst prepolymerization.

7. The process according to claim 1, wherein a weight ratio of the one or more olefin monomer(s) selected from olefin monomers of 2 to 4 carbon atoms to the solid Ziegler-Natta catalyst component (olefin monomer/solid Ziegler-Natta catalyst component) from step b) is in a range of 0.5 to 50.

8. The process according to claim 1, wherein step b) is conducted off-line in batch-mode in an inert medium.

9. The process according to claim 1, wherein the external electron donor (ED) used in the batch mode catalyst prepolymerization is selected from silanes, ethers, esters, amines, ketones, heterocyclic compounds or blends thereof.

10. The process according to claim 1, wherein the process comprises a process prepolymerization step c0) preceding polymerizing steps c) and d), into which step the prepolymerized solid Ziegler-Natta catalyst obtained in step b) is fed.

11. The process according to claim 10, wherein no additional external electron donor (ED) is added into the process prepolymerization step c0) or polymerization steps c) and d).

12. The process according to claim 1, wherein the polymerizing step c) is conducted in at least one slurry-loop reactor.

13. The process according to claim 1, wherein an amount of first propylene homo- or copolymer produced in step c) is in a range of 20 to 80 wt %, based on a total amount of the heterophasic propylene copolymer produced in the process; and an amount of polymer produced in step d) is in a range of 20 to 80 wt %, based on the total amount of the heterophasic propylene copolymer produced in the process.

14. The process according to claim 1, wherein the first propylene homo- or copolymer produced in step c) is a propylene homopolymer or a propylene ethylene random copolymer; and a polymer produced in step d) forms an elastomeric part of the heterophasic propylene copolymer.

15. The process according to claim 1, wherein the heterophasic propylene copolymer produced has
   i) a xylene cold soluble fraction (XCS) determined according to ISO 16152 (25° C.) of greater than 35 wt %, and/or
   ii) a comonomer content of greater than 10 wt %.

16. The process according to claim 1, wherein the polymerizing step c) is conducted in at least two polymerization reactors selected from slurry-loop or gas phase reactors.

17. The process according to claim 1, wherein the polymerization step c) is conducted in a combination of one slurry-loop reactor and one gas-phase reactor.

* * * * *